Dec. 22, 1925.                                                    1,566,476
                    B. P. HAYES
              TELEGRAPH TRANSMITTER
            Filed Feb. 26, 1923           6 Sheets-Sheet 1

INVENTOR
                                         Benjamin P. Hayes.
                                      BY
                                                ATTORNEY

INVENTOR
Benjamin P. Hayes.
BY Arthur C. Brown,
ATTORNEY

Patented Dec. 22, 1925.

1,566,476

UNITED STATES PATENT OFFICE.

BENJAMIN P. HAYES, OF KANSAS CITY, MISSOURI.

TELEGRAPH TRANSMITTER.

Application filed February 26, 1923. Serial No. 621,166.

*To all whom it may concern:*

Be it known that I, BENJAMIN P. HAYES, a citizen of the United States, residing at Kansas City, in the county of Jackson and State of Missouri, have invented certain new and useful Improvements in Telegraph Transmitters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to telegraph transmitters and has for its principal object to provide a device of that character comprising normally inert character members which may be selectively connected with a driving mechanism to move the members along a circuit making and breaking mechanism whereby the symbols of a telegraphic code are formed and transmitted to line.

It is also an object of the invention to provide in such device means for insuring completion of operation of each individual character member before a succeeding character member can be set, thereby avoiding interference in transmission.

Other objects of the invention are disclosed in the following description of construction and operation of the device, wherein reference is made to the accompanying drawings, in which—

Referring more in detail to the drawings:

1 designates a frame, within which the operative parts of the transmitter are mounted, and comprising a base 2 having corner legs 3 provided with cushion feet 4 whereby the transmitter may be supported from a table or the like, the legs 3 having offsets 5 provided with apertures 6 through which screws 7 may be projected for attachment to an enclosing case hereinafter described.

Along the front and rear edges of the base 2 are downwardly extending rails 8, 8', the former having slots 9 through which the key bars 10 are projected for vertical, guided travel when rocked on their fulcrum contacts with a rail 11 secured to the platform of the base by a screw 12 and extending transversely across the frame.

The rail 11 is preferably composed of an angle strip, one member of which is secured to the platform and the other extended vertically to form a fulcrum. The rail 11 is preferably provided with slots 13 for individually receiving the key bars so that the bars are held in spaced relation, and the upper edges of the key bars are preferably provided with transverse slots 14 for receiving the rail and holding the bars against longitudinal movement.

The key bars are yieldingly held in normal position with the upper edges of their forward ends abutting against the bases of the slots 9 by individual springs 15, preferably formed of flat metal having upturned forward ends 16 seating in sockets 17 in the under edges of the key bars and having their rear ends attached to the rear rail 8' of the base 2 by a clamp 18.

The clamp 18 preferably consists of an angle piece having one member lying along the rear face of the rail 8' and secured thereto by screws 19, and having its other member projected under the rail and spaced therefrom sufficiently to permit the rear ends of the springs 15 to be forced into the intervening space and held in place by friction.

The forward ends of the key bars are upturned and provided with the usual buttons 20. The buttons 20 form a key board like the ordinary typewriter key board, except that each key represents a separate character owing to the fact that the operative mechanism of the transmitter does not shift to permit one key to be employed for two or more characters. The key board in the present type of machine has nothing to do with actual operation of the character members, but merely sets the character members selectively for operation, the actual operation being effected by a driving member, common to all of the character members and preferably consisting of a clash gear 21 extending across the frame 1 and rotatably mounted on end plates 22 and 23 that are supported on the base 2 and rigidly fixed thereto by screws or the like 24.

The clash gear is preferably rotated through a friction drive mechanism consisting of a disk 25 fixed on the gear and engaged by the periphery of a drive member 26 of felt or the like, carried on a sleeve 27 slidably keyed on a shaft 28 journaled in a bearing 29 that is attached to the frame plate 22, and in a bearing 30 which forms a part of a gear housing 31 that is also attached to the frame plate 22, in spaced relation to the bearing 29.

Journaled in the gear housing is a worm shaft 32 operatively connected with the shaft 33 of an electric motor 34. The lead wires 35 and 36 of the electric motor extend to a plug socket 37, exposed at the rear of the machine. The worm shaft 32 meshes with a pinion 38 on the friction drive shaft 28 to operate the friction drive shaft when the motor is active.

Figure 11:
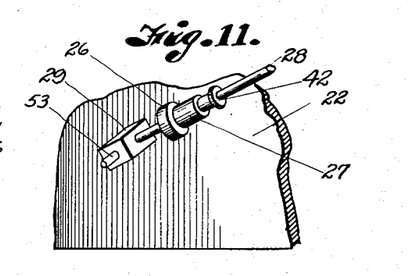
Fig. 11 is a detail perspective view of the adjustable friction drive member.
Figure 12:
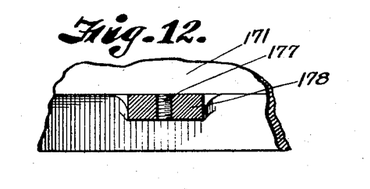
Fig. 12 is a fragmentary view of the case showing threaded sockets.

In order to adjust the speed of the clash gear, I mount the sleeve 27 slidably on the shaft 28, and provide a shifting lever 39 (Fig. 3) having a yoke 40 provided with pins 41 that extend into a groove 42 in the sleeve 27 (Fig. 11), so that when the lever is rocked the sleeve may be moved along its shaft to position the driving ring at different distances from the center of the driving disk 25 to regulate the speed of the clash gear under constant speed of the motor.

The shifting lever 39 is pivoted on a pin 43 on the side plate 22 on the base 2, and the opposite end of the lever is provided with a slot 45 into which is projected a pin 46 on a longitudinally movable bar 47, slidably mounted in a hanger 48 suspended from the base 2. The bar 47 extends through a slot 9 in the front base rail 8 and has an upturned forward end 50 provided with a handle 51 whereby the bar may be manipulated. The bar is held in adjusted position by teeth 52 on its upper edge, which engage the edge of the hanger 48 and held yieldingly in position by spring 44.

The mounting of the clash gear is preferably effected by trunnions 53 and 54 on the bearing blocks 29 and on a screw 55 respectively, the latter threaded into the frame plate 23 and held in adjusted position by a lock nut 56, the trunnions fitting in bearing sockets 57 and 58 respectively in opposite ends of the clash gear, the trunnion 54 bearing against an anti-friction member 59 interposed between the end of the trunnion and a spring 60 located within the socket so that the clash gear is yieldingly urged in the direction of the driving shaft to maintain the necessary frictional contact. The bearing block 29 is mounted on the frame plate 22 by a screw 61 and lock nut 62.

To effect driving connection of each character member with the clash gear independently of all of the other character members, I mount each character member on an individual carrier 63, which is pivoted at 64 to an upstanding rail 65 near the front of the base 2, so that when a carrier is released, as hereinafter described, it will rise to lift the character member toward the clash gear.

Each character member 43 comprises a segmental gear section 66 pivoted to its carrier at 67 and having the teeth 68 for meshing with the clash gear.

Extending from the segmental member is an arm 69 having an arcuate extension 70 concentric with the segmental member 66 and provided with teeth 71 of varying length corresponding to the dots and dashes of a telegraphic code, and adapted for engaging a brush 72, hereinafter described, when the extension is rotated beneath the brush under influence of the clash gear.

The character member is normally and yieldingly retained in an initial position by a spring 73 connected with an ear 74 struck from the segmental portion 66, and with a pin 75 on the carrier 63, the initial position of the carrier member being determined by stop shoulder 74' on the character member which engages the top of the rail 65 upon which the carrier is mounted. The segmental member 66 is also provided with a trip shoulder 76 for unlatching the parts to disconnect the character member from the clash gear, as presently described. The carrier 63 is yieldingly urged to position for effecting the driving relation of the character member and clash gear by spring 77 connected with an extension arm 63' on the carrier, so that the carrier is shifted automatically to effect the driving relation when released by manipulation of the key board. The carrier is normally retained against the tension of its spring by an ear 78 on a retainer member 79 which is pivotally and slidably mounted on a pin 80 on the front rail 65, and which projects through a slot 81 in the retainer to permit both pivotal and longitudinal movement of the retainer, the ear 78 overlying an ear 82 on the carrier and which latter is spaced from the body of the carrier to permit movement of the retainer without affecting the carrier under the conditions hereinafter disclosed.

The retainer is normally, yieldingly held in position for restraining the carrier by a spring, connected with an extension arm 83. This is preferably the spring 77 which urges the carrier to effect the driving relation of the clash gear and the character member, the single spring 77 urging the carrier forwardly and the retainer downwardly, so that they may perform their respective functions. Because the retainer arm 83 is longer than the carrier arm 63', because of the greater inertia of the carrier parts due to their mass compared with that of the retainer, and because of gravity, the retainer and carrier are held in their lowermost position until the retainer is shifted by manipulation of the key bar 10. This shifting is effected through a bell crank lever 85, part of which is located in a slot 86 in the base 2 and having a pin 87 pivotally mounted in a bearing 88 on a bracket 89 attached to the base by screws 90. One arm of the lever 85 extends alongside of the corresponding key bar 10 and has a slot 91 into which is projected a pin 92 on said bar, so that when the key bar is depressed, the pin engages the end of the slot and rocks the lever. The other arm of the lever 85 has a foot 93 engageable with a depending lug 94 on the retainer 79, so that when the lever is rocked by the key bar, the foot engages the lug and lifts the retainer to release the carrier 63, lifting of the retainer tensioning the spring 77 so that the carrier is rocked to throw the segmental gear on the character member into mesh with the clash gear. It is important to retain the character member and clash gear in driving relation until the character has been run out. This is effected by means of a latch 96 comprising a head 97 having a slot 98 within which is located a cross bar 99 carried by the rear rail 65' on the base 2, the bar forming a guide and support for the latch head.

At the rear of the head 97 is a tail 100 slidably projected through a guide slot 101 in a bracket rail 102 rising from the base 2 and secured thereto by screws 103. Surrounding the tail 100 and bearing against the bracket rail 101 and against the head 97 is a compression spring 104 which normally, yieldingly urges the latch forward.

At the front of the latch head 97 is a foot 105 which is abutted by the rear end of the retainer 79 when the parts are in normal position to hold the spring 104 compressed, so that when the retainer is shifted the latch is moved forward under tension of its spring to locate the foot 105 beneath the retainer and hold the latter from return until the character has been run out.

The trip shoulder 76 on the segmental portion of the character member is so related to the gear and character teeth that when the character has run out, the trip shoulder engages a pin 107 on the retainer and shifts the retainer longitudinally, moving the forward end of the retainer off of the latch foot against the tension of the spring 77, so that the latter can return the retainer to its normal, horizontal position. When the trip shoulder has moved off of the pin, tension of the spring 77 tends to not only rock the retainer on its pivot to lower the retainer and carrier, but it also, being stronger than the spring 104, moves the retainer longitudinally to abut the end of the retainer against the end of the latch and shift the latch back to its original position. It is apparent that when the trip shoulder moves the retainer, the latter is guided by the pin in the slotted mounting of the latter and that as the retainer moves back to horizontal position, the arm 63', being in engagement with the arm 82 on the carrier, brings the carrier back with it to disconnect the gear segment of the character member from the clash gear. As soon as the gear segment is disconnected from the clash gear, the spring 73 returns the character member to its initial position, so that the operative movement may be repeated upon a succeeding manipulation of the key bar.

I also provide a positive latch for the retainer and carrier, consisting of a rearwardly directed tooth 109 on the latch head 97, which normally overlies a forwardly directed tooth 110 on the depending rear end of the carrier 63. When the latch head moves forwardly following shift of the retainer, as before described, the latch head tooth moves from over the carrier tooth so that the carrier may rise without interference. When the operation of the character parts is completed, the carrier has been returned before the latch is shifted, so that the latch tooth can move back to its functional relation with the carrier tooth.

Interference which would be caused by one character starting in before another character has run out is prevented through a safety lock consisting of a rod 111 rotatably mounted in arms 112 depending from the base 2 and provided with a rail 113 normally underlying a notch 114 in the key bar, so that when the machine is clear the bar may be lowered to its full extent, the notch in the bar receiving the rail as the bar is lowered. To the rod 111 is rigidly fixed an arm 115 pivotally connected with a link 116 which extends up alongside the retainer and carrier, and has a slot 117 at its upper end and a hook 118 adjacent the slot. Pivotally mounted on a rod 119 carried by the side plates 22 and 23 of the inner frame, is a wing 120 having a flange 121 overlying the rear end of all of the carriers in the machine. The rear end of each carrier is provided with a slot 122 extending out to a 45 degree angle, and within which the wing flange is received when a carrier is lifted, as before described, the rear wall of the slot 122 being extended above the upper edge of the carrier to form a substantial contacting surface for the wing, and the lower edge of the wing being so located that when the wing is shifted by the inclined rear edge of the slot of an operated carrier, the edge of the wing will be projected over the top of all of the remaining carriers to hold them against vertical movement.

Attached to the wing 120 is a forwardly directed arm 124 having a pin 125 slidable in the slot 117 of the link 116, and connecting said arm with a hook 118 on the link is a spring 126 which normally, yieldingly holds the wing flange against the rear walls of the carrier slots. With this arrangement, when a carrier is raised it rocks the lock wing to shift it over the idle carriers. This movement tensions the spring 126 so that when a depressed key bar has been released the spring 126 lifts the link 116, rocks the rod 111, and projects the rail 113 forwardly and beneath all of the key bars in the set, thereby forming an obstruction which prevents depression of any of the key bars and consequently prevents the setting of a character member in mesh with the clash gear while a previous character is in mesh. When the parts are returned to normal position the lock wing is returned and the pin 125 positively engages the link 116 and rocks the stop rail back beneath the notches in the key bars, so that any of said bars may then be operated.

Figure 10:
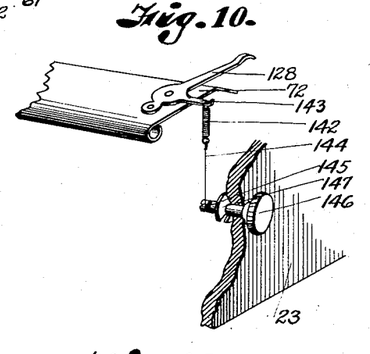
Fig. 10 is a detail perspective view of the contacting brush showing the tension adjuster.

The brush 72 heretofore referred to carries an arm 128 (Figs. 4 and 10) which overlies a contact lever 129 pivotally mounted on a bracket 130 attached to the interior frame plate 23 and having a point 131 yieldingly urged to contact with a mating point 132 carried by an arm 133 on said bracket, the arm 129 being urged to contact by a spring 134 mounted on a screw 135 on a rear arm 136 on said bracket. The contact may be adjusted by means of the screw 135 and its lock nut 137 by adjustment of the point 132 which is mounted on a screw 138 and provided with a lock nut 139 which also forms a binding post for the circuit wire 140. The tension of the brush 72 may be adjusted through a spring 142 which is attached to a finger 143 on the arm 128 (Fig. 10). Attached to the spring 142 is a cord or wire 144 wound on the shank 145 of a turn-button 146 rotatably mounted in the frame plate 23, the shank being provided with a friction washer 147 that bears against the frame plate to hold the shank in adjusted position against the tension of the spring 142. The circuit wire 140 is insulated from the bracket 133 and from the frame and is in circuit with a contact finger 149 on a bracket 150 mounted on the base 2. The contact arm 129 is grounded on the frame plate 123 so that when the points are in contact, current may flow through the frame to the contact arm. Connection is made with line through circuit wires 151 and 152 in a cord 153 carrying a jack 154 having plates 155 and 156 adapted for contact respectively with the contact finger 149 and the frame 1 when the jack is applied to the device, friction holding the jack in place when it is positioned.

Figure 1:
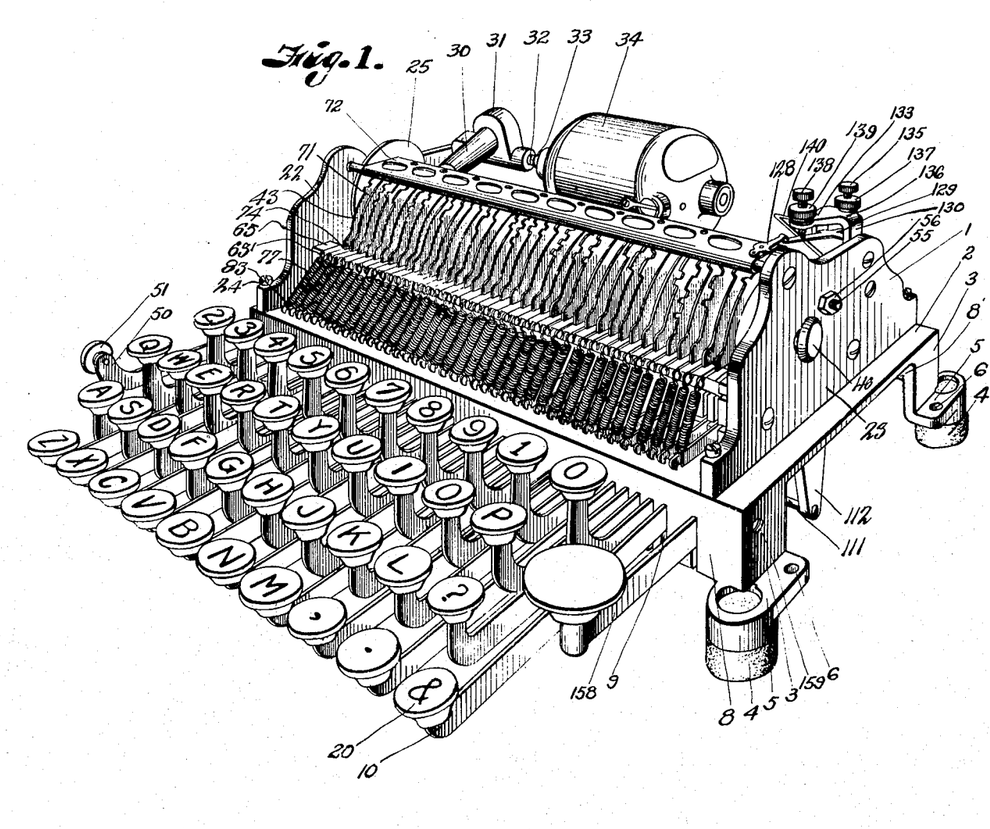
Fig. 1 is a perspective view of the operating mechanism of a telegraph transmitter embodying my improvements, the enclosing case being omitted.
Figure 2:
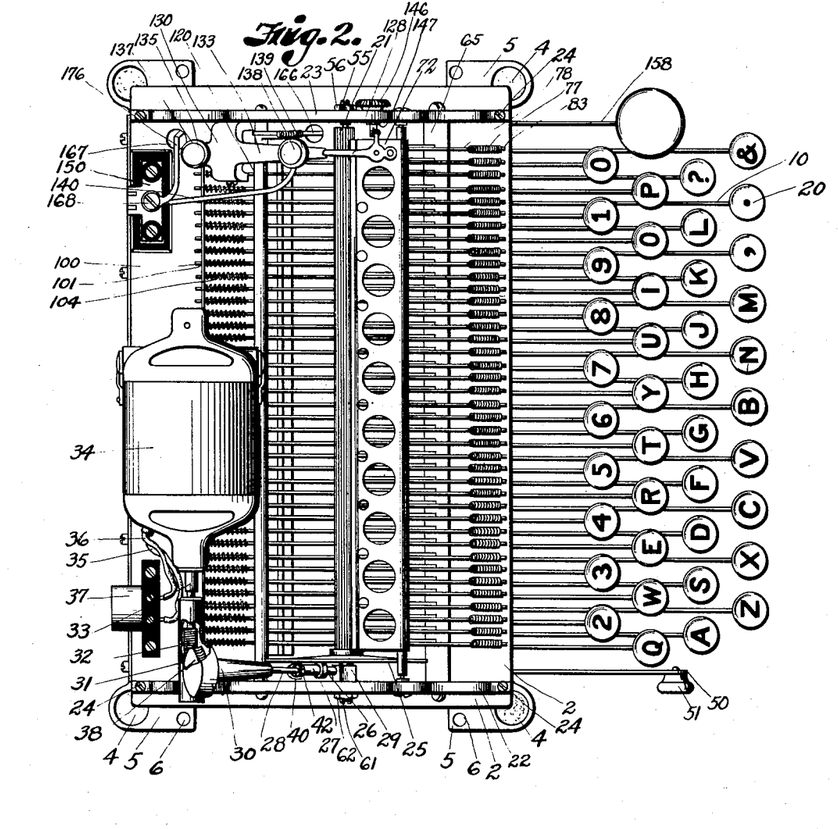
Fig. 2 is a plan view of the same.
Figure 8:
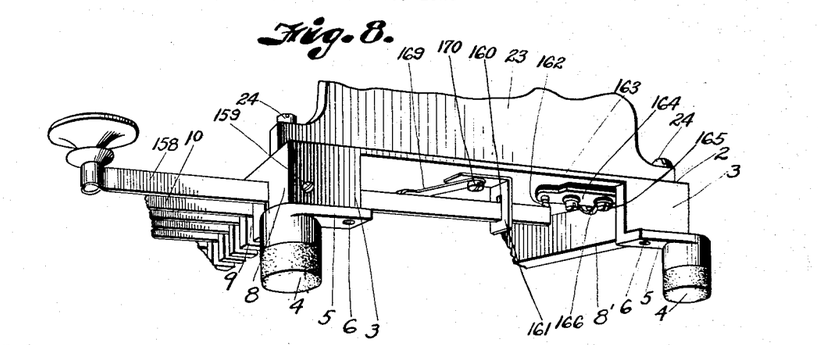
Fig. 8 is an inverted, perspective view of a portion of the interior frame showing the mounting of the key bars and the manual sending key.
Figure 9:
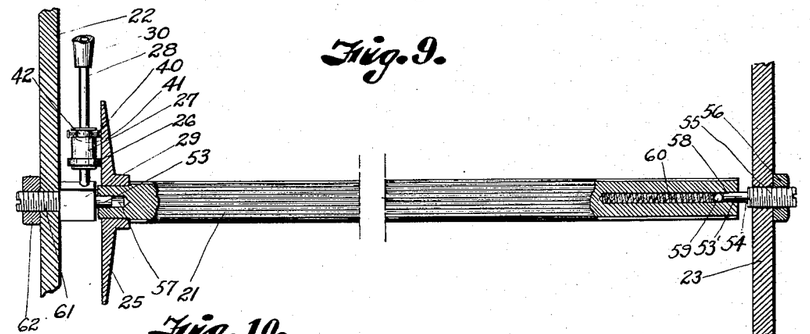
Fig. 9 is a detail view of the driving mechanism parts being in section.

Incorporated in the device is a hand key 158 (Figs. 1, 2 and 8) which extends through one of the slots 9 in the front rail of the inside frame and is pivotally mounted on a pin 159. The rear end of the key bar is extended through a slot 160 in a bracket 161 suspended from the bottom of the base 2. On the rear upper edge of the key bar is a point 162 adapted for contact with a point 163 on a bracket 164 attached to but insulated from the frame base. One of the screws 165 by which the bracket is attached to the base serves as a binding post for a circuit member 166 which extends through an aperture 167 in the base and is connected with the contact finger 149 through the binding post 168 which attaches the circuit member 140 to the bracket 150. With this arrangement a circuit may be opened and closed either by the character members or by the hand key, so that an operator may send mechanically from the key board or manually from the hand key. The hand key is normally, yieldingly urged to space the contact points 162 and 163 by a spring 169, one end of which is attached to the base 2 by the screw 170 by which the bracket 161 is attached to the base while the free end of the spring rests on and presses against the upper edge of the key bar.

The working parts of the transmitter are enclosed in a case 171 of suitable construction but preferably comprising a forward extension 172 through which the key board is exposed and by which the key board is protected, a removable cover plate 173 that may be securely attached in place but removed to expose the contained mechanism for adjustment or the like, and openings 174 and 175 through which the motor circuit block and the telegraph line jack may be extended to the proper contacts. The frame containing the working parts of the transmitter may be conveniently attached to the case by screws 7 that extend through the openings 6 in the feet 5 on the frame base into threaded sockets 177 in the shoulder 178 that extends around the lower edge of the case.

While I have described but a single character member and its related parts, it will be understood that the character member and parts are duplicated throughout the machine for as many characters as may be employed, each character member and part in the character member set being an exact duplicate of all of the others, except for the character teeth, which are varied according to the character or symbol which the member is intended to represent.

The machine illustrated in the drawing is shown to comprise 40 separate keys, each representative of a different character, and there is in the machine a character member and set of parts for each of the keys. The selection of characters or symbols may, of course, be varied, and special characters added, or some of those shown herein eliminated, if desired.

Having described the mechanical construction and combination of the parts I will give a brief description of the operation.

Assuming that the device is connected with a telegraph line through the jack, that the motor is in operation through connection with a power circuit, and that the word "The" is to be transmitted, the operator first depresses the button bearing the letter T and lowers the T key bar. This downward movement of the bar is against the tension of the spring 15 and carries the slotted part of the bar over the lock rail 113. Depression of the key bar moves the pin 92 through the slot in the bell crank lever 85 until the pin reaches the end of the slot and rocks the bell crank. This rocking of the bell crank causes the rear arm thereof to engage the retainer and rock the latter on its pivot, thereby moving the finger 78 upwardly and freeing the latch. This rocking of the retainer tensions the spring 77, tending to turn the carrier on its pivot as soon as released by movement of latch 96 forwardly by tension of spring 104, thus releasing the carrier member permitting the carrier piece to engage the clash gear. When the meshing occurs the character member is rotated, carrying the teeth 71 on the arm extension under the brush 72. The letter T being represented in the Morse code by a dash, the character member for that letter comprises a single long tooth which, engaging the brush, elevates the same so that the brush is rocked to lift the arm 128 and permit the contact 131 to engage the contact 132 for an interval corresponding to the length of the tooth. After the tooth has passed beneath the brush, the brush drops to separate the contacts and break the circuit. The foot on the gear segment then engages the pin on the retainer 79 and shifts the latter longitudinally out of holding relation with the latch 97, and when the retainer has left the latch, the spring 77 shoots the retainer longitudinally to return the latch to normal position. When the carrier was elevated, as described, the key bars for the remaining characters were locked by the rail 113 through the link mechanism, so that no other character could be thrown into gear and operated during the operation of the active member, the lock being shifted upon return of the carrier to free the machine.

When the T character has completed its operation and its carrier been returned, the spring 73 returns the character member to its normal position, so that it may start another operation when its key is again depressed.

The key for the letter H is then depressed and the operation just described is repeated with the H character, the only difference being that H is represented in the Morse code by four dots and consequently there are four contact periods instead of one, and each of the contacts is shorter than for the single contact of the T character. This is effected by four rounded teeth on the H character arm, each of which successively raises and permits the brush 72 to drop. When the H character has been completed and the parts returned to normal, the E key is depressed and the operation described repeated for the dot indicative of the letter E in the Morse code, this character having but one short tooth on the character arm.

This arrangement of teeth on the respective character members is carried throughout the machine, but will not be described in detail, as the scheme of the character teeth on wheels, bars, or the like for operating a brush in this manner has heretofore been employed and is generally known in the art.

Figure 3:
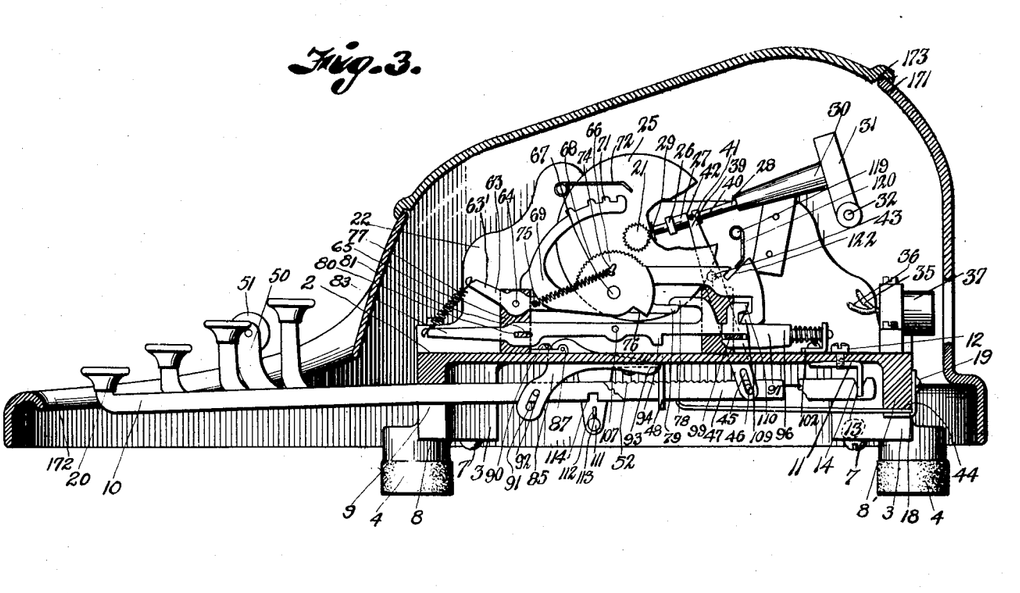
Fig. 3 is a side elevation of the device, the enclosing case being in section.
Figure 4:
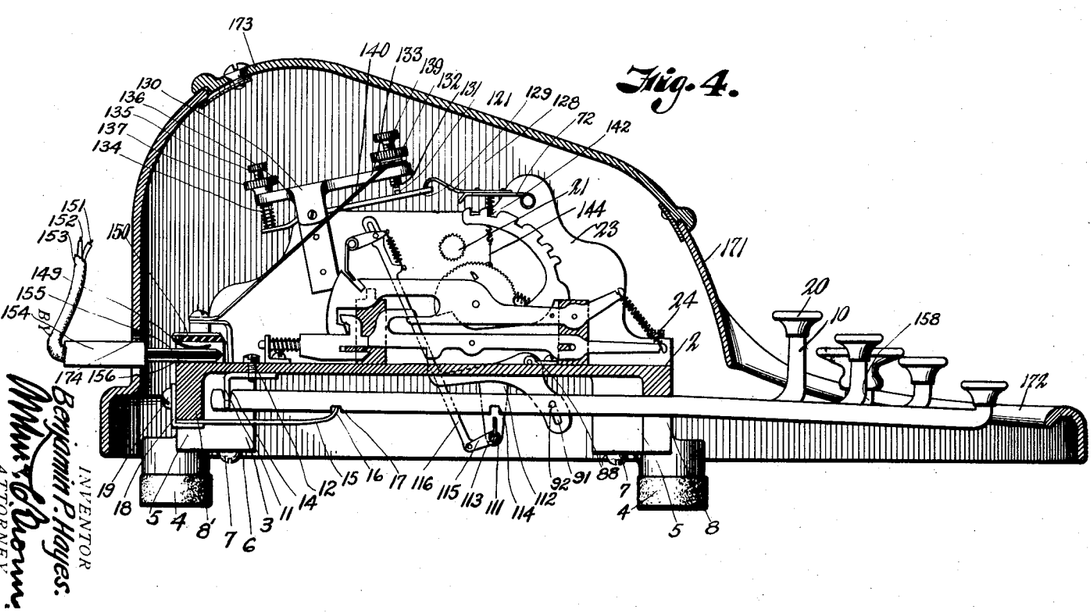
Fig. 4 is a similar view from the opposite side, particularly illustrating the circuit making and breaking mechanism and the locking mechanism.
Figure 5:
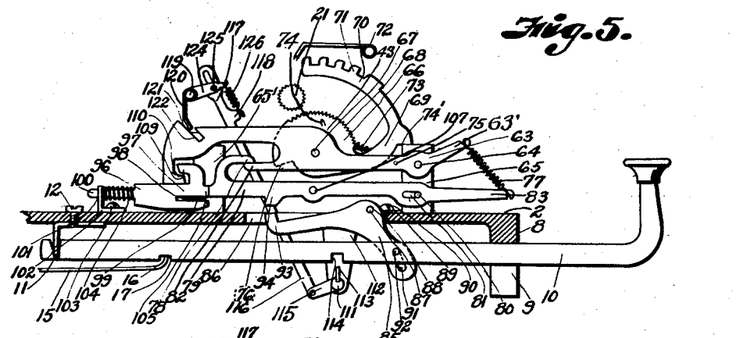
Fig. 5 is a detail side elevation of a character set showing a character member in inert position.
Figure 6:
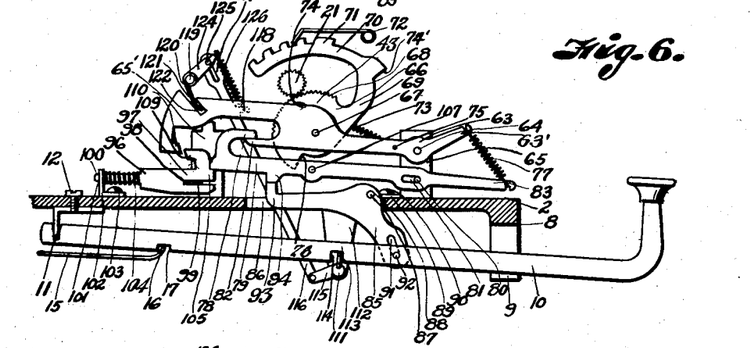
Fig. 6 is a similar view showing a character member partially run, but wherein the setting key is depressed.
Figure 7:
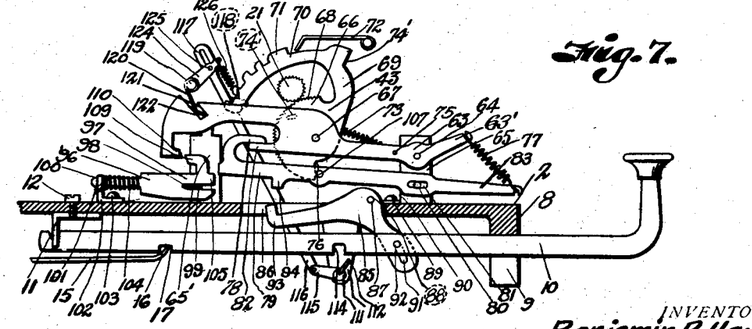
Fig. 7 is a similar view showing the character member completely run and about to trip the latching mechanism to permit return of the parts to normal position.

Throughout the drawings I have shown character members for three different letters—that in Fig. 4 comprising two dots, two dashes and two dots constituting the period in the Morse code; Fig. 3 showing three dots, a space and a dot constituting the Z; and Figs. 5, 6, and 7 showing four dots and a dash indicative of the numeral 4.

What I claim and desire to secure by Letters-Patent is:

1. A telegraph transmitter comprising a constantly rotatable driving member and a normally inert character member, one movable to operative engagement with the other, means yieldingly urging the movable member to the operative engagement, a yieldable restraining device for the movable member, shifting mechanism operable on the restraining device to permit movement of the movable member to the operative engagement, a latch for the restraining device, rendered inoperative by the character member as the latter completes an operative phase, and circuit making and breaking mechanism operable by the character member.

2. A telegraph transmitter comprising a constantly rotatable driving member and a normally inert character member, one movable to operative engagement with the other, means yieldingly urging the movable member to the operative engagement, a longitudinally and axially movable device normally restraining the movable member, shifting mechanism operable on the restraining device to permit movement of the movable member to the operative engagement, a latch for retaining said device in shifted position, the restraining device engageable by the character member as the latter completes an operative phase to move said device from engagement with the latch, means yieldingly retaining said device in restraining position and shifting said device to reset the latch, and circuit making and breaking mechanism operable by the character member.

3. A telegraph transmitter comprising a constantly rotatable driving member, a carrier, means yieldingly urging the carrier toward the driving member, a character member rotatable on the carrier and engageable with the driving member, a yielding device for restraining the carrier, shifting mechanism for the restraining device, a latch for the restraining device, and circuit making and breaking mechanism operable by the character member, the character member engaging the restraining device upon completion of an operative phase to unseat the restraining device from its latch.

4. A telegraph transmitter comprising a driving member, a carrier movable toward and from the driving member, a character member rotatable on the carrier and engageable with the driving member, a restraining device engageable with the carrier, a latch normally adapted for holding the carrier in spaced relation to the driving member and adapted for preventing return of the restraining device, shifting mechanism for the restraining member, a spring connecting the carrier and restraining member, urging the carrier toward the driving member and effecting return of the restraining member, and circuit making and breaking mechanism operable by the character member.

5. A telegraph transmitter comprising a pivotally mounted carrier, a character member rotatable on the carrier, a restraining device engageable with the carrier, yielding means for spreading the carrier and restraining device, shifting mechanism for the restraining device, a driving member engageable by the character member upon operation of the shifting mechanism to effect rotation of the character member, a latch automatically movable to position for retaining the restraining device in shifted position, the restraining device being engageable by the character member to unseat the restraining device from its latch upon completion of an operative phase of the character member, yielding means for returning the restraining device and effecting engagement thereof with the latch to reset the latch, and circuit making and breaking mechanism operable by the character member.

6. A telegraph transmitter comprising a constantly rotatable driving member, a pivotally mounted carrier, yieldingly urged toward the driving member, a restraining device normally retaining the carrier in spaced relation to the driving member, a latch automatically movable to holding relation with the restraining device, shifting mechanism for the restraining device, a character member rotatable on the carrier, yieldingly retained in set position and engageable with the restraining device to unseat said device from its latch, yielding means for returning the restraining device and effecting resetting engagement thereof with said latch, and circuit making and breaking mechanism operable by the character member.

7. A telegraph transmitter comprising a constantly rotatable driving member, a pivotally mounted carrier, a restraining device for the carrier, having longitudinal and pivotal movement, shifting mechanism for the restraining device, a latch movable to holding relation with the restraining device when the latter is shifted, yielding means for effecting pivotal movement of the carrier and longitudinal and pivotal movement of the restraining device, the character member engageable with the restraining device to unseat said device from its latch whereby the carrier and restraining device are returned and the restraining device shifted longitudinally to resetting engagement with the latch, circuit making and breaking mechanism operable by the character member, and yielding means returning the character member to initial position upon return of the carrier.

8. A telegraph transmitter comprising a constantly rotatable driving member, a pivotally mounted carrier, a character member movably mounted on the carrier, a longitudinally and pivotally mounted restraining device for the carrier, a spring connecting the carrier and restraining device tending to shift the carrier in one direction to effect engagement of the character member with the driving member, and pivotal movement of the restraining device in the opposite direction to restrain the carrier, shifting mechanism for the restraining device to move said device against the tension of its spring and relieve the carrier, a latch yieldingly urged to holding position with the shifted restraining device, circuit making and breaking mechanism operable by the character member, the character member engageable with the restraining device upon completion of an operative phase to unseat the restraining device from said latch, the restraining device being returnable on its axis and movable longitudinally under tension of said spring to return the carrier and said latch, and a spring for returning the character member to initial position when the character member is freed from the driving member upon return of the carrier.

9. A telegraph transmitter comprising a constantly rotatable driving member, a pivotally mounted carrier yieldingly urged toward the driving member, a restraining device for holding said carrier against the tension of said yielding means, shifting mechanism for the restraining device, a latch for the restraining device, a character member pivotally mounted on the carrier, having a driving section engageable with the driving member and having a foot engageable with the restraining device to unseat the latter from its latch, a spring for returning the character member to initial position when relieved from the driving member, and circuit making and breaking mechanism operable by the character member.

10. A telegraph transmitter comprising a constantly rotatable driving member, a pivotally mounted carrier, a pivotally and longitudinally movable restraining device for the carrier, a longitudinally movable latch having a head for retaining the restraining device in shifted position and an arm for preventing shifting movement of the carrier, the latch being normally restrained by the restraining device, yieldingly projectable to latching position relative to the restraining device, and to unlatching position relative to the carrier upon shifting of the restraining device, shifting mechanism for the restraining device, a spring connected with the carrier and with the restraining device urging the carrier toward the driving member and urging the restraining device to hold the carrier, said spring serving to shift the restraining device longitudinally to return the latch when the restraining device is unseated from the latch, the character member engageable with the restraining device to unseat the same against the tension of said spring, a spring connected with the character member to return the same to initial position when relieved from the driving member, and circuit making and breaking mechanism operable by the character member.

11. A telegraph transmitter comprising a constantly rotatable driving member, a pivotally mounted carrier, a character member rotatable on the carrier and engageable with the driving member, a restraining device for the carrier, a lever for operating the restraining device to effect relief of the carrier, a key bar operatively connected with said lever, a latch for the restraining device, the character member engageable with the restraining device to unseat the latter from its latch, and circuit making and breaking mechanism operable by the character member.

12. A telegraph transmitter comprising a constantly rotatable driving member, a plurality of independently operable carriers, a character member on each carrier engageable with the driving member, a restraining device for each carrier, a latch for each restraining device, an individual setting mechanism for each restraining device, a lock common to all of the said devices and operable by any of said carriers to prevent operation of a succeeding setting device during an operative phase of the transmitter, and circuit making and breaking mechanism operable by any of the character members.

13. A telegraph transmitter comprising a driving member, a carrier for a character member, automatically movable from restrained to set position, a character member on the carrier engaging the driving member when the carrier is in set position, a device normally restraining the carrier, but movable independently thereof, mechanism for shifting the restraining device, a latch normally restrained by the restraining device in position to stop the carrier and automatically movable to latch the restraining device when the latch is shifted, the restraining device being engageable by the character member as the latter completes an operative phase to unseat said device from its latch, means moving the unseated restraining device pivotally to return the carrier and longitudinally to return the latch, and circuit making and breaking mechanism operable by the character member.

14. A telegraph transmitter comprising a driving member, a pivotally mounted carrier yieldingly urged toward the driving member, a character member movably mounted on the carrier, yieldingly restrained and having a trip foot, a longitudinally and pivotally movable device normally, yieldingly restraining the carrier, a latch normally, yieldably restrained by the restraining device and automatically movable to latching relation with said device when said device is shifted to release the carrier, the restraining device movable from latching relation with the latch by the trip foot on the character member as said member completes an operative phase, the restraining device having automatic pivotal movement to return the carrier and automatic longitudinal movement to return the latch, and circuit making and breaking mechanism operable by the character member.

15. A telegraph transmitter comprising, in combination with a constantly rotatable driving member, a normally inert character member movable to operative engagement with the driving member, manually and automatically operable latches for restraining the character member, and circuit making and breaking means operable by the character member.

16. A telegraph transmitter, in combination with a constantly rotatable driving member, a normally inert character member movable to operative engagement with the driving member, manually operable means normally restraining the character member from engagement with the driving member, a latch controlling engagement of the character member with the driving member, automatically operable following actuation of the restraining member to permit snap connection of the character member with the driving member, and circuit making and breaking means operable by the character member.

17. A telegraph transmitter comprising, in combination with a constantly rotatable driving member, a normally inert character member movable to operative engagement with the driving member, a manually operable device normally restraining the character member from engagement with the driving member, an automatically movable latch controlled by the restraining device and secondarily restraining the character member, and circuit making and breaking mechanism operable by the character member.

18. In a telegraph transmitter, circuit making and breaking mechanism, a driving member, a carrier movable toward and from the driving member, a character member movable with the carrier to engage the driving member and on the carrier to operate the circuit making and breaking mechanism, and means automatically returning the character member to initial position following release of the character member from the driving member.

19. In a telegraph transmitter, circuit making and breaking mechanism, a constantly rotatable driving gear, a carrier movable toward and from the driving gear, a character member movably mounted on the carrier, having a gear toothed section engageable with the driving gear to advance the character member and a character toothed section operable on the circuit making and breaking mechanism, means automatically returning the character member to normal position upon completion of its functional travel, and mechanism manually controlled to permit movement of the carrier toward the driving member and automatically operable to effect return of the carrier, said mechanism having trip engagement by the character member as the latter completes its functional travel to initiate return movement of the carrier.

20. In a telegraph transmitter, circuit making and breaking mechanism, a constantly rotatable driving gear, a carrier movable toward and from the driving gear, a spring-retracted character member movably mounted on the carrier, having a gear toothed section engageable with the driving gear to advance the character member and having a character toothed section operable on the circuit making and breaking mechanism, a device primarily restraining the carrier, manually operable to release the carrier and automatically operable to return the carrier, a latch, spring-urged to position for preventing return of the restraining device and returnable by the restraining device, trip members on the character member and restraining device engageable as the character member completes an operative phase to set the restraining device for its return travel, and means operable on the restraining device to effect return of the restraining device, the carrier and the latch to their initial positions.

21. In combination with a plurality of independently movable carriers, a character member on each carrier, a common driving member for all of the character members, individual controlling means for each of said carriers, and a lock operable by the carrier of a selected character member, to position for restraining the remaining carriers and automatically returnable to free said carriers when the carrier of the selected character member is returned.

22. In combination with a plurality of independently movable carriers, a character member on each carrier, a common driving member for all of the character members, individual controlling means for each of said carriers, and a lock movable by the carrier of a selected character member to position for restraining the controlling means of the remaining carriers and means returning the controlling means of said remaining carriers when the carrier of the selected character member is returned.

23. In combination with a plurality of independently movable carriers, each having a cam portion, a character member on each carrier, a common driving member for all of the character members, control mechanism for each carrier, a lock movable by the cam portion of any carrier to position for restraining the remaining carriers and a spring normally restraining the lock and returning the lock when said carrier is returned, and circuit making and breaking mechanism operable by the character members.

24. In combination with a plurality of independently movable carriers, a character member on each of said carriers, a common driving member for all of said character members, control mechanism for each of said carriers comprising a key bar, a lock lever operable by any of said carriers, a stop bar operable by the lock bar to prevent operation of remaining key bars, and circuit making and breaking mechanism operable by the character members.

In testimony whereof I affix my signature.

BENJAMIN P. HAYES.